(12) United States Patent
Dilo

(10) Patent No.: US 9,725,830 B2
(45) Date of Patent: Aug. 8, 2017

(54) DEVICE FOR CONVEYING A FIBER WEB OR A WEB OF NONWOVEN

(71) Applicant: Oskar Dilo Maschinenfabrik KG, Eberbach (DE)

(72) Inventor: Johann Philipp Dilo, Eberbach (DE)

(73) Assignee: Oskar Dilo Maschinenfabrik KG (DE)

(*) Notice: Subject to any disclaimer, the term of this patent is extended or adjusted under 35 U.S.C. 154(b) by 0 days.

(21) Appl. No.: 15/272,508

(22) Filed: Sep. 22, 2016

(65) Prior Publication Data

US 2017/0088358 A1 Mar. 30, 2017

(30) Foreign Application Priority Data

Sep. 30, 2015 (EP) ..................................... 15187647

(51) Int. Cl.
| | |
|---|---|
| *D01G 25/00* | (2006.01) |
| *B65G 21/20* | (2006.01) |
| *D03D 3/04* | (2006.01) |
| *B65G 15/00* | (2006.01) |

(52) U.S. Cl.
CPC ............. *D01G 25/00* (2013.01); *B65G 15/00* (2013.01); *B65G 21/2063* (2013.01); *D03D 3/04* (2013.01)

(58) Field of Classification Search
CPC .................................................... D01G 25/00
See application file for complete search history.

(56) References Cited

U.S. PATENT DOCUMENTS

| | | | | |
|---|---|---|---|---|
| 4,984,772 A * | 1/1991 | Freund | ..................... | D04H 1/74 19/163 |
| 5,353,477 A * | 10/1994 | Hille | ........................ | D04H 1/74 19/163 |
| 7,318,255 B2 * | 1/2008 | Bastian | ................... | D01G 25/00 19/161.1 |
| 7,690,086 B2 * | 4/2010 | Dilo | ........................ | D01G 25/00 19/163 |
| 7,895,715 B2 * | 3/2011 | Leger | ...................... | D01G 25/00 19/296 |
| 8,458,999 B2 * | 6/2013 | Dilo | ........................ | D01G 25/00 57/296 |
| 8,464,400 B2 * | 6/2013 | Dilo | ........................ | D01G 25/00 19/163 |
| 8,495,799 B2 * | 7/2013 | Dilo | ........................ | D01G 25/00 19/163 |
| 2016/0298274 A1 * | 10/2016 | Meier | .................... | D04H 1/736 |

FOREIGN PATENT DOCUMENTS

| | | |
|---|---|---|
| EP | 1947223 | 7/2008 |
| EP | 2479321 | 7/2012 |
| EP | 2806055 | 11/2014 |

* cited by examiner

*Primary Examiner* — Thomas Randazzo
(74) *Attorney, Agent, or Firm* — Jansson Munger McKinley & Kirby Ltd.

(57) ABSTRACT

The device for conveying a fiber web comprises a transport device, which serves as a support for the fiber web, and which is driven by a drive in a transport direction at a speed of at least 50 m/min. The transport device has a rough surface and carries along the fiber web resting on the transport device by force of friction. An array of linear elements arranged above the transport device serves to cover the fiber web resting on the transport device. The linear elements have a smooth surface, and the fiber web is carried along the bottom surface of the linear elements. The linear elements are arranged next to each other but spaced apart in a direction transverse to the transport direction.

9 Claims, 5 Drawing Sheets

DEVICE FOR CONVEYING A FIBER WEB OR A WEB OF NONWOVEN

CROSS REFERENCE TO RELATED APPLICATION

This application claims priority based on European patent application EP 15 187 647.1 filed Sep. 30, 2015. The entire disclosure and contents of this application is incorporated by reference into the present application.

FIELD

The field is generally related to production of fiber webs and nonwovens and, more particularly, to a device for conveying a fiber web or a web of a nonwoven.

BACKGROUND

In the production of nonwovens, it can be advisable, especially at high production speeds of >100 m/min, to provide a covering structure to cover the fiber web or the web of nonwoven conveyed on a transport device and thus to prevent the fibers from being blown about.

For example, a technology of this type has been used in crosslappers. Crosslappers serve to deposit the fiber web produced by a carding machine in multiple layers as uniformly as possible onto an output conveyor belt to obtain the web of nonwoven. The fiber web is usually guided first through an upper carriage and from there to a laying carriage, through the laying nip of which the fiber web is deposited onto the output conveyor belt. At least two fiber web conveyor belts are used to guide the fiber web through the crosslapper. The movements of the fiber web conveyor belts, of the upper carriage, and of the laying carriage are controlled in coordination with each other.

In the area extending from the infeed area of the crosslapper to the upper carriage, it is advantageous for the fiber web not just to rest on a web conveyor belt but also to be covered from above by a cover belt. In this way, the fiber web can be prevented from being blown about, and thus the uniformity of the deposited web of nonwoven can be ensured. Structures of this type are known from, for example, DE 195 43 623 A1, EP 1 136 600 A1, and EP 1 870 499 B1. The disadvantage of these crosslapper configurations is the complexity with which the endless cover belt is guided, which requires a large number of components and a great deal of mechanical effort.

U.S. Pat. No. 8,495,799 B2 discloses a simplified configuration of a crosslapper, in which the cover belt is provided with a smooth surface and is not moved concomitantly with the fiber web but rather serves, in effect, as a stationary cover over the fiber web. To ensure that the cover belt protects the fiber web on the fiber web conveyor belt for the longest possible time, the cover belt extends from an attachment point in the infeed area of the crosslapper through the upper carriage to a second attachment point at the other end of the crosslapper.

This configuration suffers from the disadvantage that, as the cover belt slides through the upper carriage, high relative velocities occur between the stationary cover belt and the upper carriage, which is moved transversely back and forth. This results in stress on the cover belt and increased wear, especially in the area of the reversal point of the upper carriage.

SUMMARY

It is an object of the present invention to provide a device for conveying a fiber web or a web of nonwoven which prevents the fiber web or the web of nonwoven from being blown about even at high speeds and which also ensures the effective off-channeling of entrained air.

According to an aspect of the invention, the device for conveying a fiber web or a web of nonwoven preferably comprises a transport device, which serves as a support for the fiber web or the web of nonwoven and which is driven by a drive in a transport direction at a speed of at least 50 m/min. Preferably, the transport device has a rough surface and carries along the fiber web or the web of nonwoven resting on the transport device by force of friction. In addition, in preferred embodiments, an array of linear elements arranged above the transport device is provided to cover the fiber web or the web of nonwoven resting on the transport device. The linear elements have smooth surfaces, and the fiber web or the web of nonwoven is moved along the bottom surface of the linear elements. The linear elements are arranged next to each other but a certain distance apart in a direction transverse to the transport direction.

With this configuration, damage to the fiber web or the web of nonwoven caused by the blowing-about of material or by the formation of folds can be prevented, and at the same time it is ensured that the entrained air is effectively channeled off. As a result, the fiber web or web of nonwoven can be transported at high speed.

The linear elements are preferably arranged to extend in the transport direction, parallel to each other. Thus the fiber web or the web of nonwoven can be guided along the bottom surface of the linear elements with almost no interference.

The linear elements preferably comprise a width of 1-5 mm. The linear elements are preferably arranged at distance of 2-50 mm from each other, and more preferably of about 10-30 mm.

In a preferred embodiment, the linear elements are stretched between two guiding elements. The linear elements can be configured as narrow belts, twines, cords, braided wires, or solid wires.

During operation, the linear elements are preferably arranged at a distance of 0.1-100 mm above the transport device, even more preferably at a distance of 0.5-5 mm.

The transport device is preferably configured as an endless conveyor belt.

BRIEF DESCRIPTION OF THE DRAWINGS

The drawings illustrate a preferred embodiment including the above-noted characteristics and features of the device. The device will be readily understood from the descriptions and drawings. In the drawings.

DETAILED DESCRIPTION

Figure 1:
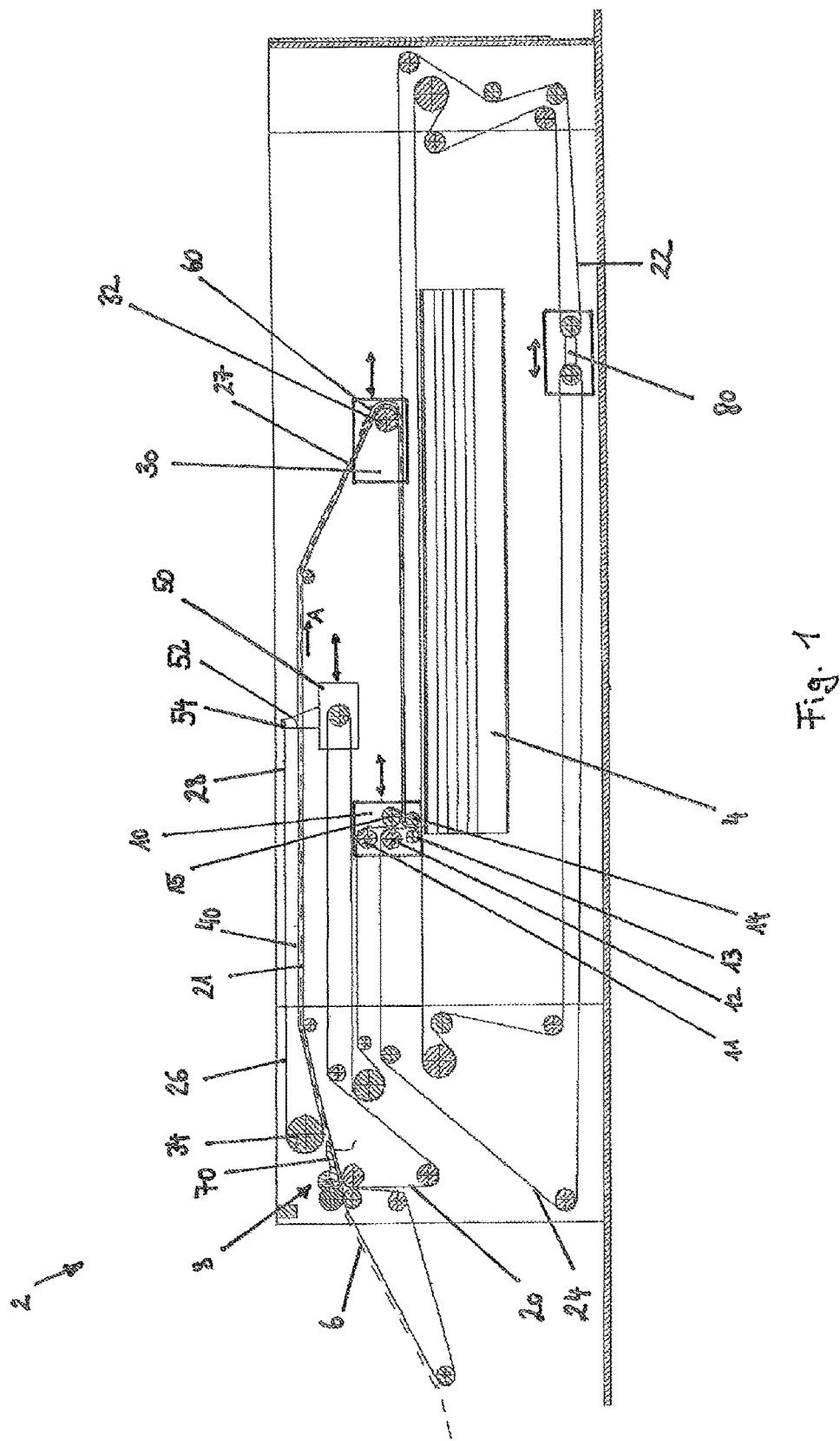
FIG. 1 is a schematic, cross-sectional diagram of a crosslapper with an embodiment of the device for conveying a fiber web according to the invention.

FIG. 1 is a schematic cross-sectional view of a crosslapper 2 including an embodiment of the device for conveying a fiber web according to the invention. FIG. 1 shows crosslapper 2 with an endless output conveyor belt 4, which is intended to carry away a web of nonwoven laid from a fiber web 6 in an output direction perpendicular to the plane of the drawing. For the sake of clarity, the fiber web 6 is shown in broken line, and it is transported on an upper run 21 of a transport device 20, also called the "first fiber web conveyor belt," in the direction of arrow A (transport direction).

Above the output conveyor belt 4, a laying carriage 10 can move back and forth on rails or pipes (not shown). In laying carriage 10, five deflection rollers 11, 12, 13, 14, 15 are supported in freely rotatable fashion. The first deflection roller 11 and the fifth deflection roller 15 are partially wrapped by the first fiber web conveyor belt. The first fiber web conveyor belt is deflected in such a way that it leaves laying carriage 10 above a third fiber web conveyor belt 24. The fourth deflection roller 14 is partially wrapped by a second fiber web conveyor belt 22, which runs between the upper carriage 30 and laying carriage 10 very close to the first fiber web conveyor belt, is deflected by 180° around the fourth deflection roller 14, and then returns, very close to output conveyor belt 4, to upper carriage 30 by way of several deflection rollers installed permanently in the machine stand. Deflection rollers 12 and 13 in laying carriage 10 are partially wrapped by a third fiber web conveyor belt 24, which also extends a short distance above output conveyor belt 4 and returns to laying carriage 10 by way of several deflection rollers permanently mounted in the machine stand. In the embodiment of a crosslapper shown here with three fiber web conveyor belts, second and third fiber web conveyor belts 22, 24 are deflected in a common tension carriage 80 in an area underneath output conveyor belt 4. One skilled in the art will know of many other embodiments of crosslappers with two or more fiber web conveyor belts adapted to the forming of a web of nonwoven on an output conveyor belt 4 and according to which the arrangement and guidance of the fiber web conveyor belts and the arrangement and number of deflection rollers in laying carriage 10 and in the machine stand can be varied.

On laying carriage 10, a chain or a toothed belt is installed, which, for example, runs over a drive wheel connected to a motor and a deflection roller (none of these elements is shown). By use of these drive devices, laying carriage 10 can be moved back and forth above delivery conveyor belt 4 transversely to the output direction.

At approximately the same height as laying carriage 10, an upper carriage 30 is supported movably on rails or pipes (not shown) in the machine stand of crosslapper 2, so that it can move transversely to the output direction of output conveyor belt 4. The rails or pipes can be the same rails or pipes on which laying carriage 10 is also movably supported. Upper carriage 30 has a deflection roller 32, around which the first fiber web conveyor belt is deflected so that it becomes parallel to second fiber web conveyor belt 22 and can proceed toward laying carriage 10.

Proceeding from deflection roller 32 in upper carriage 30, the first fiber web conveyor belt (transport device 20) passes through laying carriage 10 and from there is guided around several deflection rollers in the machine stand and a deflection roller supported in a tension carriage 50, whereupon it runs back over several deflection rollers permanently mounted in the machine stand of crosslapper 2 above tension carriage 50 before finally reaching upper carriage 30 again. Upper carriage 30 and tension carriage 50 can be connected to each other by a chain or toothed belt (not shown), which runs over a drive wheel connected to a motor (not shown) and a deflection roller, these two components being mounted in the machine stand (not shown). Tension carriage 50 is also movably supported on rails or pipes (not shown).

In the area between deflection roller 32 of upper carriage 30 and deflection rollers 14 and 15 of laying carriage 10, sections of first fiber web conveyor belt and of second fiber web conveyor belt 22 are guided parallel to each other and only a short distance apart, so that fiber web 6 supplied by first fiber web conveyor belt is sandwiched between first fiber web conveyor belt and second fiber web conveyor belt 22 in the area just mentioned between upper carriage 30 and laying carriage 10. Fiber web 6 is supported on second fiber web conveyor belt 22. In addition, the two sections of second fiber web conveyor belt 22 extending between laying carriage 10 and the machine stand of crosslapper 2 simultaneously serve the function of a cover belt for the laid nonwoven.

It can be seen in FIG. 1 that, during operation, upper carriage 30 and its associated tension carriage 50 move in opposite directions. Tension carriage 50 serves to keep the length of the loop of the first fiber web conveyor belt constant.

The movements of laying carriage 10 and upper carriage 30 are coordinated with each other in such a way that, as the fiber web 6 is supplied at uniform speed to crosslapper 2, a controlled deposition of fiber web 6 onto delivery conveyor belt 4 can occur without stretching or compression within crosslapper 2. During this process, upper carriage 30 travels in the same direction as laying carriage but on average at only half its speed. Account is also taken of the fact that laying carriage 10 is braked to a stop in the area where it reverses direction and must then be accelerated again. If fiber web 6 is supplied at fluctuating speed as a result, perhaps, of a cyclically operating web drafter, which is installed upstream from crosslapper 2 (not shown) to produce alternations in the weight per unit area of fiber web 6 and thus to achieve a transverse profiling of the laid web of nonwoven, the movements of upper carriage 30 and of laying carriage 10 can be controlled independently of each other in the known manner to create a storage buffer for the fiber web inside crosslapper 2.

Between deflection rollers 13 and 14 in laying carriage 10, a gap is formed, which is called the "laying nip". During operation of crosslapper 2, the two fiber web conveyor belts 22, 24 are driven in such a way that they travel at the same speed. Fiber web 6 is guided through the laying nip and deposited onto output conveyor belt 4.

Crosslapper 2 of FIG. 1 comprises a cover 26, which comprises a cover section 40 extending from an infeed area 8 of crosslapper 2 to upper carriage 30. Cover section 40 extends directly above upper run 21 of first fiber web conveyor belt, which, in this area, serves as a support surface for fiber web 6 and which moves in the direction of the arrow A. Fiber web 6 is thus sandwiched between upper run 21 of transport device 20 and cover section 40 of cover 26. Whereas first fiber web conveyor belt is rough, cover 26 is smooth, so that fiber web 6 can slide along the bottom surface of cover section 40.

Transport device 20 (first fiber web conveyor belt) can be configured as an air-permeable screen belt, but preferably it is impermeable to air. The expert will be familiar with other material and design alternatives of transport device 20 adapted to the purpose. Second fiber web conveyor belt 22 is preferably identical to the first fiber web conveyor belt with respect to its surface and material properties.

As a result of frictional forces, the endless first fiber web conveyor belt (transport device 20) carries along fiber web 6 lying on it, and cover section 40 of cover 26, which is not carried along with fiber web 6, serves as a cover and thus prevents fiber web 6 from being blown about undesirably. Fiber web 6 thus remains largely free of turbulence, as a result of which higher fiber web speeds can be realized. In other words, fiber web 6 is guided in sandwich fashion between upper run 21 of transport device 20 and cover section 40 of cover 26, wherein it is carried forward primarily by the movement of the first fiber web conveyor belt, smooth cover 26 offering no resistance to the movement of fiber web 6. In all cases cover 26 must be prevented from interfering with the ability of fiber web 6 to slide freely along it, and no fibers may adhere to it.

A first end section 27 of cover 26 is connected to upper carriage 30 at an attachment point. As can be seen in FIG. 1, preferably at least one first fiber web guide element 60 is provided in the section between this attachment point of first end section 27 of cover 26 in upper carriage 30 and the point where fiber web 6 is transferred to second fiber web conveyor belt 22. Fiber web guide 60 guides fiber web 6 in this area, wherein fiber web 6 is sandwiched between first fiber web guide 60 and first fiber web conveyor belt. Fiber web guide 60 extends advantageously over the entire area between the attachment point of cover 26 and the transfer point of fiber web 6 onto second fiber web conveyor belt 22 and is to be brought up as close as possible to second fiber web conveyor belt 22. The contour of fiber web guide 60 is adapted to the path of the first fiber web conveyor belt (transport device 20) and of fiber web 6 around deflection roller 32. Fiber web guide 60 adapted to the purpose are known to the expert from, for example, U.S. Pat. No. 7,779,513 B2 and can be varied in form and number as appropriate, as long as the secure guidance and coverage of fiber web 6 are guaranteed. It is especially advantageous for the attachment point of first end section 27 of cover 26 in the upper carriage to be located on fiber web guide 60, because then fiber web 6 is enclosed almost continuously up as far as the laying carriage 10. First, it is enclosed between the first fiber web conveyor belt and cover section 40 of cover 26, then by the first fiber web conveyor belt and fiber web guide 60, and finally between first fiber web conveyor belt and second fiber web conveyor belt 22. As a result, fiber web 6 will not be blown about even at high web speeds and high accelerations of upper carriage 30.

A compensating mechanism serves to compensate for the change in length of cover section 40 of cover 26 as upper carriage 30 travels in the transverse direction.

In the preferred embodiment shown here, cover 26 is conducted, in infeed area 8 of crosslapper 2, upward from the first fiber web conveyor belt and around deflecting roller 34, so that at least second end section 28 of cover 26 is substantially parallel to upper run 21 of the first fiber web conveyor belt. Deflecting roller 34 can preferably be configured as a multi-disk deflection roller.

In the embodiment according to FIG. 1, the compensating mechanism is implemented with the help of tension carriage 50 of first fiber web conveyor belt. For this purpose, two tension brackets 52 are provided on tension carriage 50, and tension brackets 52 are attached to the sides of tension carriage 50 and project upward from tension carriage 50 beyond upper run 21 of first fiber web conveyor belt (transport device 20). Two tension brackets 52 are connected to each other by a rail 54, which comprises a mounting for the second end section 28 of cover 26. This embodiment is especially space-saving and simple, because ideally the movement of tension carriage 50 is already inversely coupled with the movement of upper carriage 30, and thus, no additional moving machine parts or control elements are needed.

It is obvious, however, that one skilled in the art will also be able to find other ways to implement the compensating mechanism. For example, second end section 28 of cover 26 can be rolled onto and off a supply roll, or a separate tension carriage can be provided for second end section 28. Some other type of storage mechanism is also conceivable.

To prevent fiber web 6 as effectively as possible from being blown about in infeed area 8, preferably a second fiber web guide 70 can be provided in infeed area 8 up to a point at which fiber web 6 is sandwiched between first fiber web conveyor belt (transport device 20) and cover section 40 of cover 26. Second fiber web guide 70 guides fiber web 6 in this section, wherein fiber web 6 is sandwiched between second fiber web guide 70 and first fiber web conveyor belt. Second fiber web guide 70 extends advantageously from infeed area 8 of crosslapper 2 up as far as deflection roller 34 (preferably a multi-disk roller) of fiber web conveyor belt 26 and is brought up as close as possible to it. With respect to the configuration of second fiber web guide 70, the expert can use first fiber web guide 60 for orientation, wherein the contour of second fiber web guide 70 is to be adapted to the path of the first fiber web conveyor belt. In addition, other suitably adapted fiber web guide 70 such as cover belt sections can also be used.

Figure 2:
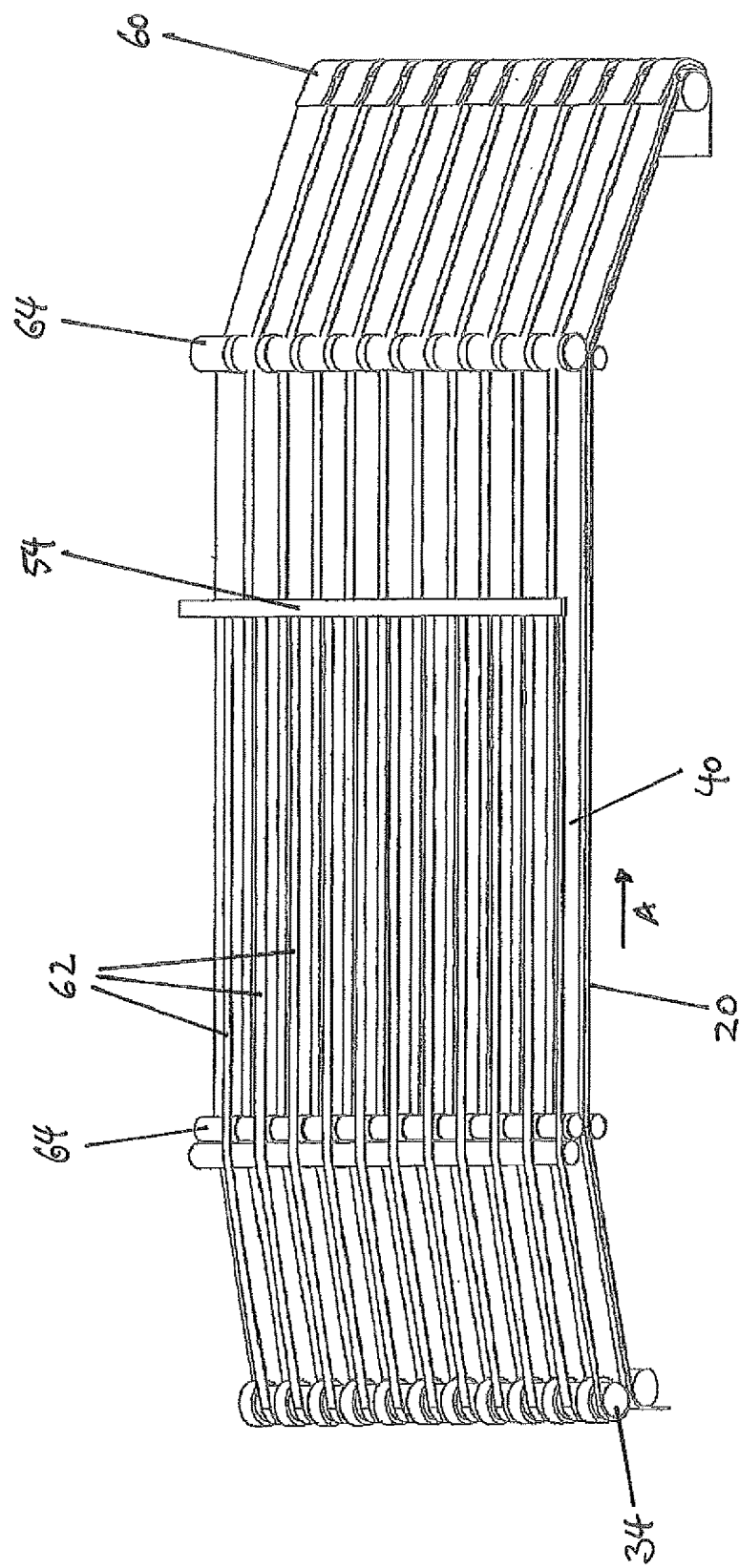
FIG. 2 is a schematic perspective view of a slightly modified form of the linear elements of FIG. 1 for covering the fiber web.

FIG. 2 shows an embodiment of cover 26 of FIG. 1, wherein some of the details of the way in which cover 26 is guided are slightly modified. Cover 26 is formed by an array of linear elements 62. Linear elements 62 are arranged a certain distance above transport device 20. They are parallel to each other in the transport direction A of transport device 20. They are also adjacent to each other, but spaced apart, in the direction transverse to the transport direction A. Linear elements 62 are preferably held under tension.

In the example shown, linear elements 62 are realized as narrow belts, which can be made of, for example, thin high-grade steel, plastic, Teflon®, or coated textile material. Cords, twines, braided wire, or solid wire of these materials can also be used as linear elements 62. For example, wires with Teflon®, plastic-coated wires, or high-grade steel wires can be used.

Linear elements 62 are preferably non-rigid. In all cases, linear elements 62 must have a smooth surface, so that fiber web 6 being carried along on transport device 20 can easily slide along the bottom surface of linear elements 62.

The width of the individual linear elements is preferably in the range of 1-5 mm. The distance between two linear elements 62 is preferably in the range of 2-50 mm, and more preferably in the range of 10-30 mm.

When linear elements 62 are used, the air carried along by the fiber web 6 can escape through the intermediate spaces between individual linear elements 62. To this extent, transport device 20 does not necessarily have to be air-permeable.

In the example shown in FIG. 2, linear elements 62 are wound in loops around deflection rollers 64 to prevent linear elements 62 from applying too much pressure to fiber web 6 at these points. Linear elements 62, however, could also be conducted in a straight line, without any looping.

Figure 3:
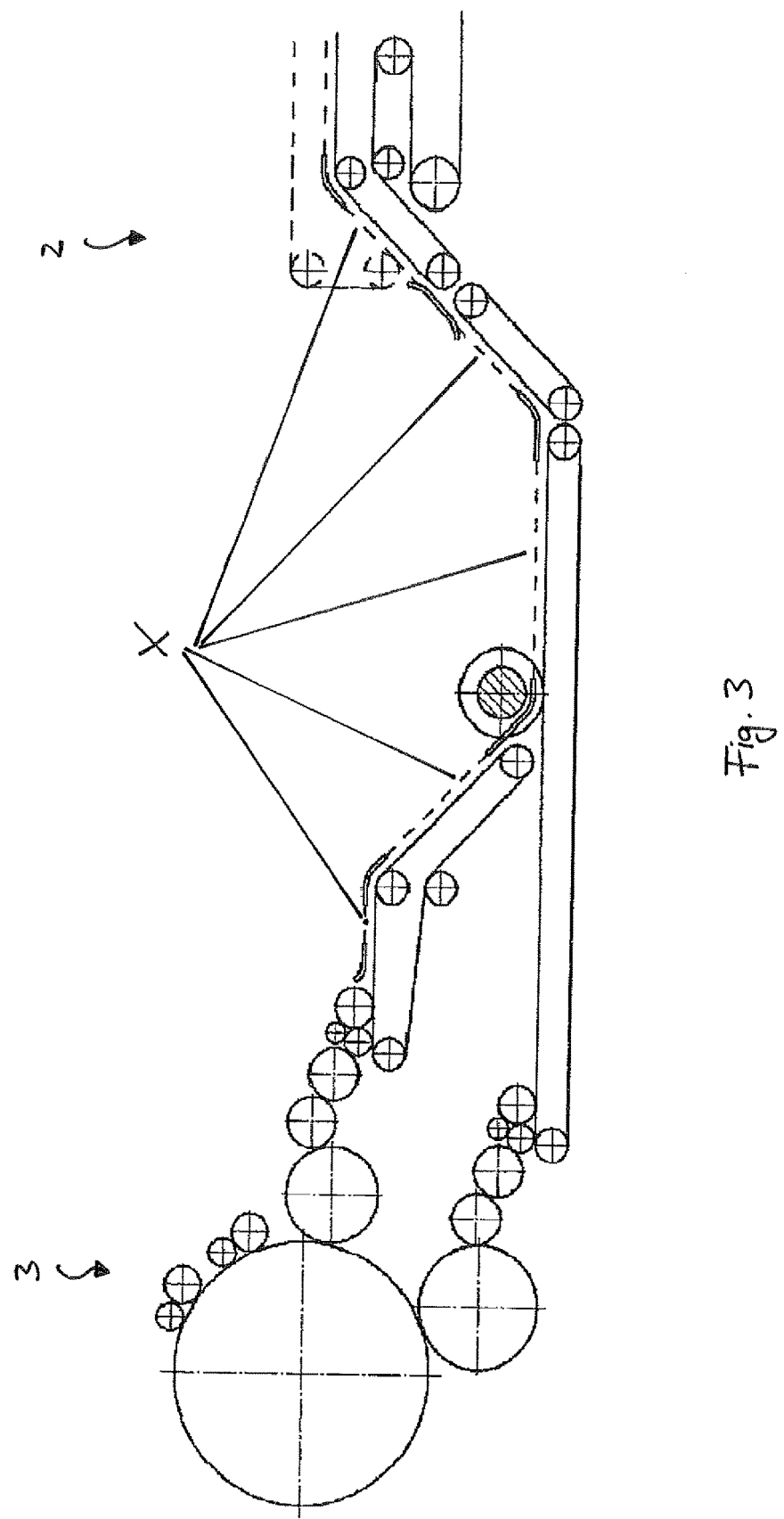
FIG. 3 is a schematic cross-sectional view of a transport section between the carding machine and the crosslapper with several embodiments of devices for conveying a fiber web according to the invention.

FIG. 3 shows by way of example the points in the area between carding machine 3 and crosslapper 2 wherein the device according to the invention for conveying a fiber web can be used. The points are marked "X". The invention is also applicable to all types of crosslappers. As can be seen in FIG. 3, the transport direction A of the fiber web does not necessarily have to be straight. On the contrary, the transport direction A could also have curved or angled sections. Especially high centrifugal forces develop at the deflection points, so that the use of the device according to the invention is especially helpful in such areas.

Figure 4:
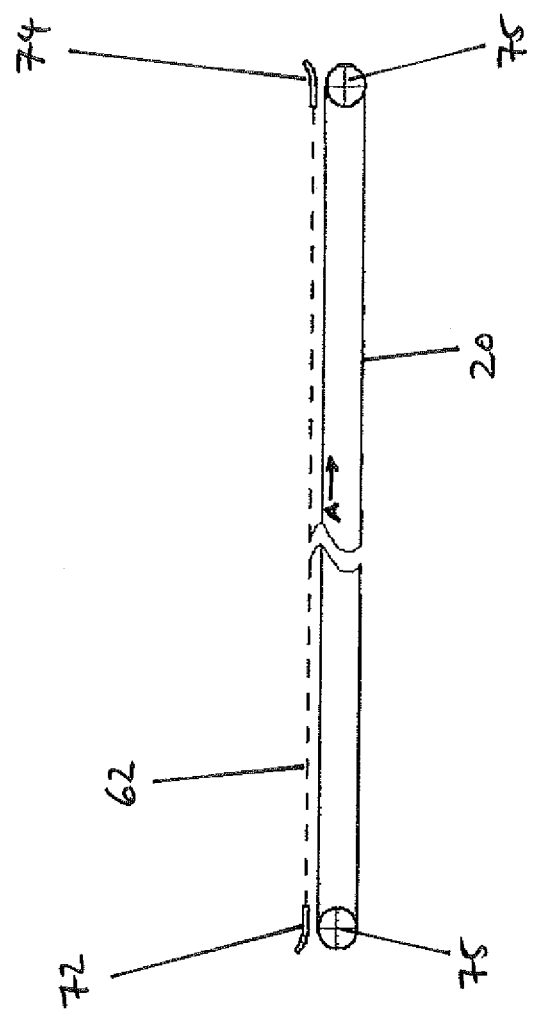
FIG. 4 is a schematic cross-sectional view of a simple embodiment of the device for conveying a fiber web according to the invention.

FIG. 4 shows a basic embodiment of the device for conveying a fiber web or a web of nonwoven according to the invention. Transport device 20 is configured as an endless conveyor belt, which wraps around two deflection rollers 75, at least one of which is driven. Linear elements 62 are shown in broken line, wherein several of these linear elements 62 are arranged one after the other in the plane of the drawing. In the infeed area of the fiber web or nonwoven, a guide 72 is arranged, to which a first end section of linear elements 62 is attached. In the output area of the fiber web or the web of nonwoven, a guide 74 is also arranged, to which a second end section of linear elements 62 is attached. Linear elements 62 are preferably kept under tension between two guides 72, 74. Guides 72, 74 are preferably slightly curved to assist the arrival of the fiber web or the web of nonwoven and/or the departure of the fiber web or the web of nonwoven. In the infeed area of the fiber web or web of nonwoven, what is obtained is therefore a feed gap which tapers down in the transport direction A, whereas, in the output area of the fiber web or the web of nonwoven, an output gap is obtained, which widens out in the transport direction A.

Figure 5:
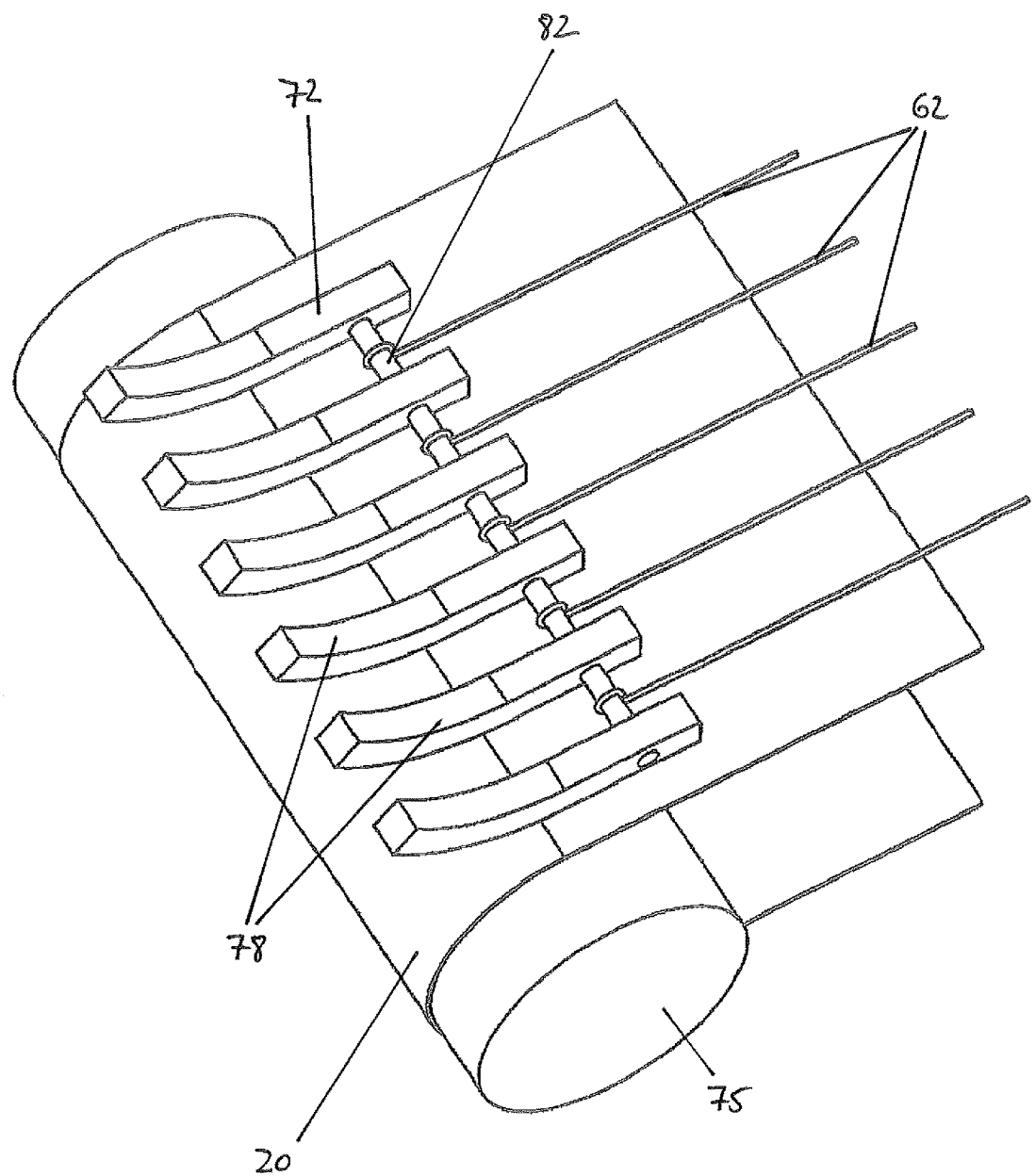
FIG. 5 is a schematic, perspective view of a section of the device for conveying a fiber web according to FIG. 4.

FIG. 5 shows an infeed area of the fiber web or the web of nonwoven according to the embodiment of FIG. 4 in detail. Here, guide 72 is formed by several fingers 78, which are arranged a certain distance apart transversely to the transport direction A of the fiber web or the web of nonwoven and which are connected to each other at the inner end area by a connecting rod 82. Guide 72 can also be configured, however, as guide plates, guide rollers, etc.

In the present example of FIG. 5, linear elements 62 are realized as lengths of twine, each of which is attached to connecting rod 82 in the intermediate spaces between two fingers 78. Any of the other variants of the realization of linear elements 62 cited above, however, is also conceivable. Linear elements 62 can also be attached to guide 72 in a different way.

The structure of the output area of the fiber web or the web of nonwoven, i.e., the area of guide 74, is preferably identical to that of the infeed area.

With the configuration of a device for conveying a fiber web or a web of nonwoven according to the invention, it is possible with little structural effort to realize high line speeds without the risk of the fiber web or the web of nonwoven being blown about undesirably.

In all cases, the frictional force between the fiber web or the web of nonwoven and transport device 20 is greater than the frictional force between the fiber web or the web of nonwoven and array of linear elements 62. The coefficient of friction between the fiber web or the web of nonwoven and transport device 20 is also preferably greater than the coefficient of friction between the fiber web or the web of nonwoven and the array of linear elements.

The distance between the array of linear elements 62 and transport device 20 depends on the fiber web or the web of nonwoven to be conveyed and is usually in the range of 0.1-100 mm, preferably in the range of 0.5-5 mm. The height of the array of linear elements 62 is preferably adjustable.

The array of linear elements 62 can also extend over only one partial section of transport device 20. It can also be stationary, as shown by way of example in FIG. 4, but it can also be carried along with transport device 20 over a certain distance, or it can even be made of sections which are moved in opposite directions, such as shown in the embodiment of FIGS. 1 and 2.

The use of the device according to the invention can be effective especially in the case of fine fibers even at transport speeds of the transport device 20 of 50 m/min or more. Usually, however, it will be especially important once the transport speed of transport device 20 reaches at least 100 m/min, preferably at least 125 m/min, more preferably at least 150 m/min, and even more preferably at least 175 m/min.

Transport device 20 is preferably configured as an endless, one-piece conveyor belt. In certain embodiments, however, it could also be formed out of several endless belts, cords, twines, braided wires, or solid wires arranged adjacent and parallel to each other.

A wide variety of materials are available for the various parts discussed and illustrated herein. While the principles of this device have been described in connection with specific embodiments, it should be understood clearly that these descriptions are made only by way of example and are not intended to limit the scope of the device.

The invention claimed is:

1. A device for conveying a fiber web or a web of nonwoven, the device comprising:
    a transport device, the transport device (a) being a support for the fiber web or the web of nonwoven; (b) being driven by a drive in a transport direction at a speed of at least 50 meters/minute; and (c) including a rough surface which carries along the fiber web or the web of nonwoven resting on the transport device by force of friction; and
    an array of linear elements having a smooth surface and being arranged above the transport device to cover the fiber web or the web of nonwoven resting on the transport device,
wherein the fiber web or the web of nonwoven moves along a bottom surface of the linear elements and the linear elements are arranged to extend in the transport direction and parallel to each other and are arranged adjacent to each other, but spaced apart, in a direction transverse to the transport direction.

2. The device of claim 1 wherein the linear elements comprise a width of 1-5 millimeters.

3. The device of claim 1 wherein the linear elements are arranged at a distance of 2-50 millimeters from each other.

4. The device of claim 1 wherein the linear elements are arranged at a distance of 10-30 millimeters from each other.

5. The device of claim 1 wherein the linear elements are stretched between two guides.

6. The device of claim 1 wherein the linear elements are configured as narrow belts, twines, cords, braided wires, or solid wires.

7. The device of claim 1 wherein the linear elements are arranged at a distance of 0.1-100 millimeters above the transport device.

8. The device of claim 1 wherein the linear elements are arranged at a distance of 0.5-5 millimeters above the transport device.

9. The device of claim 1 wherein the transport device is configured as an endless conveyor belt.

* * * * *